(12) United States Patent
Frischman et al.

(10) Patent No.: US 12,725,141 B2
(45) Date of Patent: Sep. 1, 2026

(54) FIXED RETAIL SCANNER WITH TRANSLATOR TO CONVERT EMBEDDED NON-VIDEO DATA AS VIDEO DATA AND RELATED METHODS OF USING HISTOGRAM DATA

(71) Applicant: Datalogic IP Tech S.r.l., Lippo di Calderara di Reno (Bologna) (IT)

(72) Inventors: Kyle Frischman, Eugene, OR (US); WenLiang Gao, Eugene, OR (US); Alan Guess, Veneta, OR (US)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 155 days.

(21) Appl. No.: 18/412,252

(22) Filed: Jan. 12, 2024

(65) Prior Publication Data

US 2024/0242194 A1 Jul. 18, 2024

Related U.S. Application Data

(60) Provisional application No. 63/479,954, filed on Jan. 13, 2023.

(51) Int. Cl.
*G06K 7/10* (2006.01)
*G06Q 20/20* (2012.01)

(52) U.S. Cl.
CPC .................................. *G06Q 20/208* (2013.01)

(58) Field of Classification Search
CPC ........... G06Q 30/0283; G06Q 30/0202; G06Q 20/208; G06Q 20/20; G06Q 20/12; G06Q 20/18; G06Q 20/409; G06Q 20/4015; G06Q 20/4014
USPC ..................................................... 235/462.25
See application file for complete search history.

(56) References Cited

U.S. PATENT DOCUMENTS

| | | | |
|---|---|---|---|
| 7,527,207 B2 | 5/2009 | Acosta et al. | |
| 8,269,868 B2 | 9/2012 | Olmstead et al. | |
| 8,430,318 B2 | 4/2013 | Mcqueen et al. | |
| 8,448,859 B2 * | 5/2013 | Goncalves | G07G 1/0054 235/383 |
| 8,573,497 B2 | 11/2013 | Gao et al. | |
| 8,632,011 B2 | 1/2014 | Gao | |
| 8,752,768 B2 | 6/2014 | Gao | |
| 8,998,092 B2 | 4/2015 | Gao | |
| 9,004,359 B2 | 4/2015 | Shearin et al. | |
| 9,122,939 B2 | 9/2015 | Gao et al. | |
| 9,305,198 B2 | 4/2016 | Thompson et al. | |
| 9,514,344 B2 | 12/2016 | Gao et al. | |
| 10,049,247 B2 | 8/2018 | Gao | |
| 10,248,896 B2 | 4/2019 | Gao et al. | |
| 10,824,826 B2 | 11/2020 | Guess et al. | |
| 10,970,502 B2 | 4/2021 | Canini et al. | |
| 11,481,751 B1 * | 10/2022 | Chaubard | G06V 10/82 |

(Continued)

FOREIGN PATENT DOCUMENTS

EP 2588993 A1 5/2013

*Primary Examiner* — Daniel St Cyr
(74) *Attorney, Agent, or Firm* — Stoel Rives LLP

(57) ABSTRACT

The disclosure includes a fixed retail scanner and related method for converting embedded register statistical data from one or more images into pixel data that is combined with image pixel data that is sent to the system processor for a fixed retail scanner. Such statistical data may include histogram data, image statistics, and other related information.

20 Claims, 14 Drawing Sheets

(56) References Cited

U.S. PATENT DOCUMENTS

2008/0019615 A1* 1/2008 Schnee .................. G06V 10/12
382/313
2011/0286628 A1* 11/2011 Goncalves .......... G06F 16/5854
382/218
2015/0069123 A1* 3/2015 Thompson ........... G06K 7/1096
235/440
2015/0310601 A1* 10/2015 Rodriguez ........... G06Q 20/208
348/150
2018/0314863 A1* 11/2018 Gao ..................... G06K 7/1456
2021/0334479 A1 10/2021 Gururaja et al.
2021/0334480 A1 10/2021 Gururaja et al.

* cited by examiner

MultipleItem$_M$G1500.avi GreyScale Tracking frame# 300

1700

Bin # (0-63)

frame #

FIXED RETAIL SCANNER WITH TRANSLATOR TO CONVERT EMBEDDED NON-VIDEO DATA AS VIDEO DATA AND RELATED METHODS OF USING HISTOGRAM DATA

PRIOR APPLICATION

This application claims the benefit of U.S. Provisional Application No. 63/479,954, filed Jan. 13, 2023, and entitled "FIXED RETAIL SCANNER WITH TRANSLATOR TO CONVERT EMBEDDED NON-VIDEO DATA AS VIDEO DATA AND RELATED METHODS OF USING HISTOGRAM DATA," the disclosure of which is incorporated by reference herein in its entirety.

TECHNICAL FIELD

The present disclosure relates generally to scanners or code readers, and more particularly, to fixed retail scanners having image data and embedded data used for advanced features in a data reading system.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

Advanced features in a barcode reading system may be beneficial for detecting and tracking an item in a scan volume since they can be used for tasks. Conventional ways of doing this may include a separate subsystem composed of hardware such as LEDs, Photodiodes and related control. Downsides of this method may include additional hardware & software costs, and less coverage of detection volume. Another method of item detection and tracking may use the image or image sequence by machine learning methods such as R-CNN, fast R-CNN etc. Challenges of these methods is additional processing resources may be required, which may prove difficult in obtaining a training dataset with enough representative of actual use environment. The inventors have appreciated a benefit in using a statistical analysis of embedded data in the images to detect the presence and absence of an item in the field of view. As a result, additional hardware and processing resources may reduced or eliminated to perform this task described herein.

BRIEF SUMMARY

A fixed retail scanner including a data reader includes at least one imager configured to capture one or more images; a system processor configured to decode one or more indica; and an image processor operably coupled between the at least one imager and the system processor, the image processor including a data translator configured to convert embedded register statistical data from one or more images into pixel data that is combined with image pixel data that is sent to the system processor as a modified data packet for additional processing and decoding.

A method of pre-processing image data for a fixed retail scanner comprises capturing one or more images via at least one imager of a fixed retail scanner; decoding one or more indica from the one or more images via a system processor of the fixed retail scanner; converting, via a data translator implemented in an image processor operably coupled between the at least one imager and the system processor, embedded register and statistical data from the one or more images into pixel data that is combined with image pixel data; and sending the combined pixel data from the image processor to the system processor.

DETAILED DESCRIPTION

Figure 1:
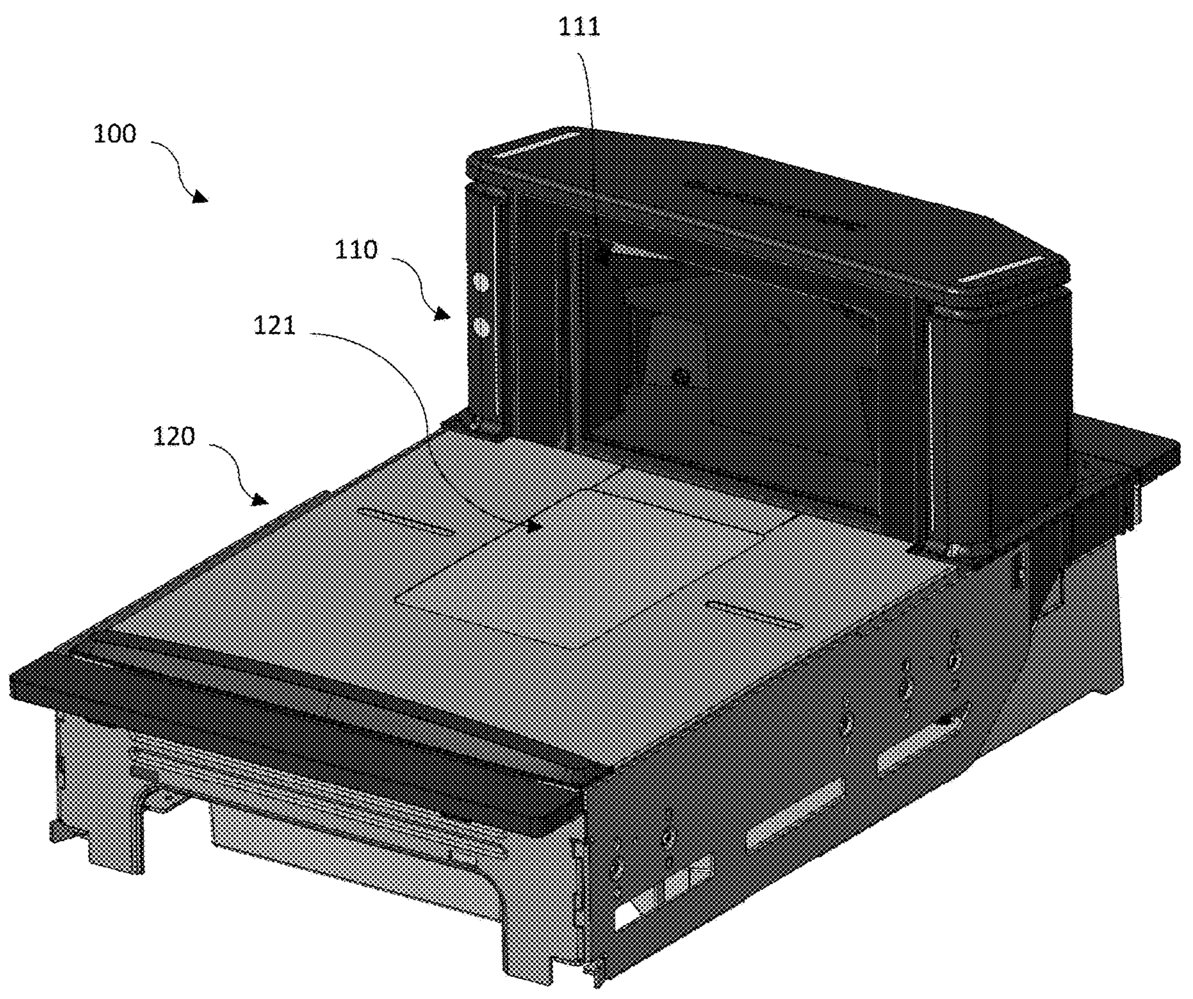
FIG. 1 is a perspective view of a data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for case of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

Figure 2:
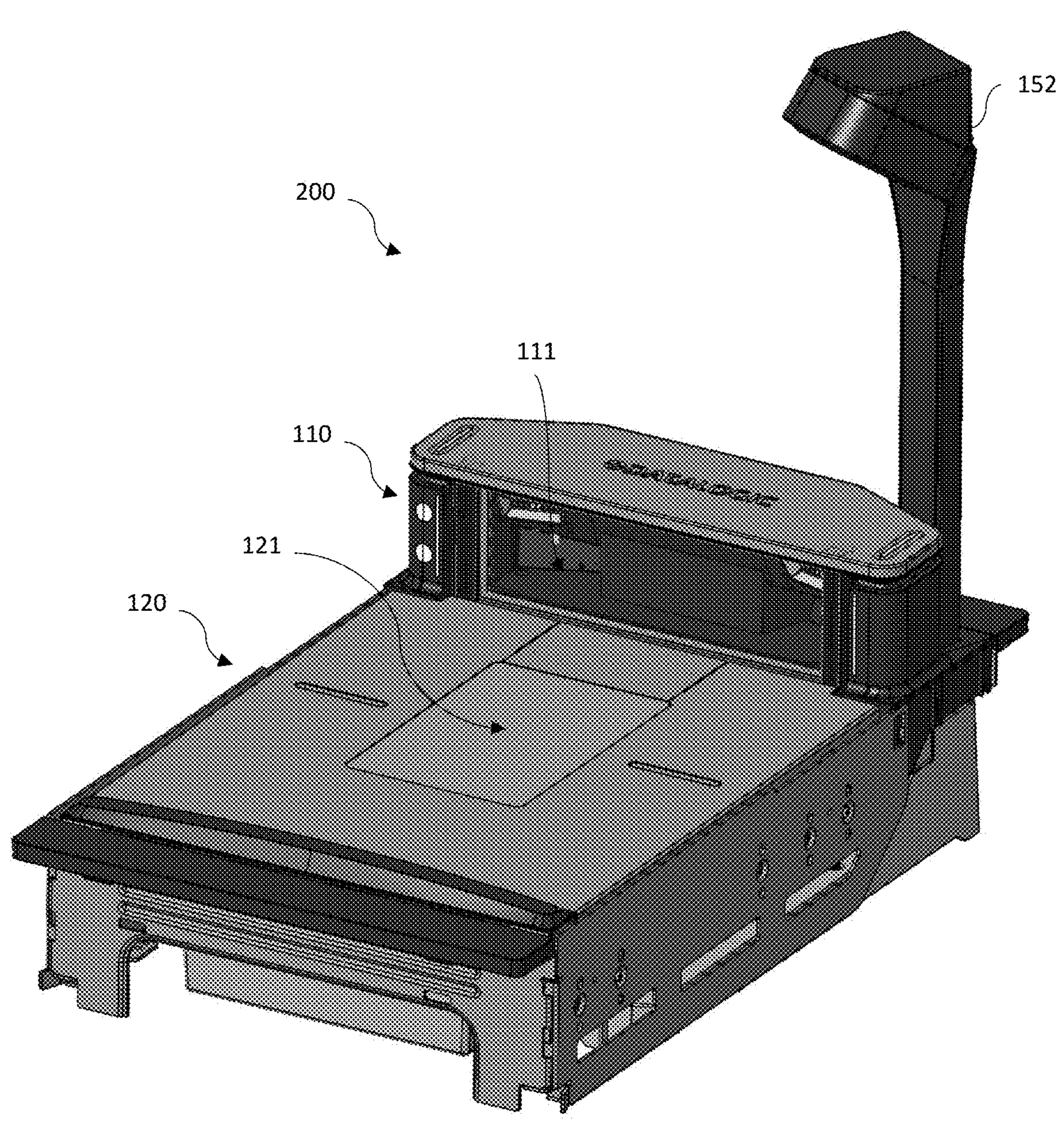
FIG. 2 is a perspective view of an illustrative data reader according to an embodiment of the disclosure.

FIG. 2 is a perspective view of an illustrative data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing of FIG. 2 may have a lower profile bonnet compared to that of FIG. 1, which may result in internal cameras having a lower incidence angle. Thus, such a form factor may be particularly well suited to include the TDR 152 as an optional add-on to the data reader 200. However, a TDR 152 may also be coupled to the data reader 100 of FIG. 1 having the taller bonnet. Such a TDR may need to be taller to accommodate the taller bonnet. In addition, some embodiments may include additional TDRs, such as on the other side of the bonnet, to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Pat. No. 10,970,502, issued Apr. 6, 2021, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
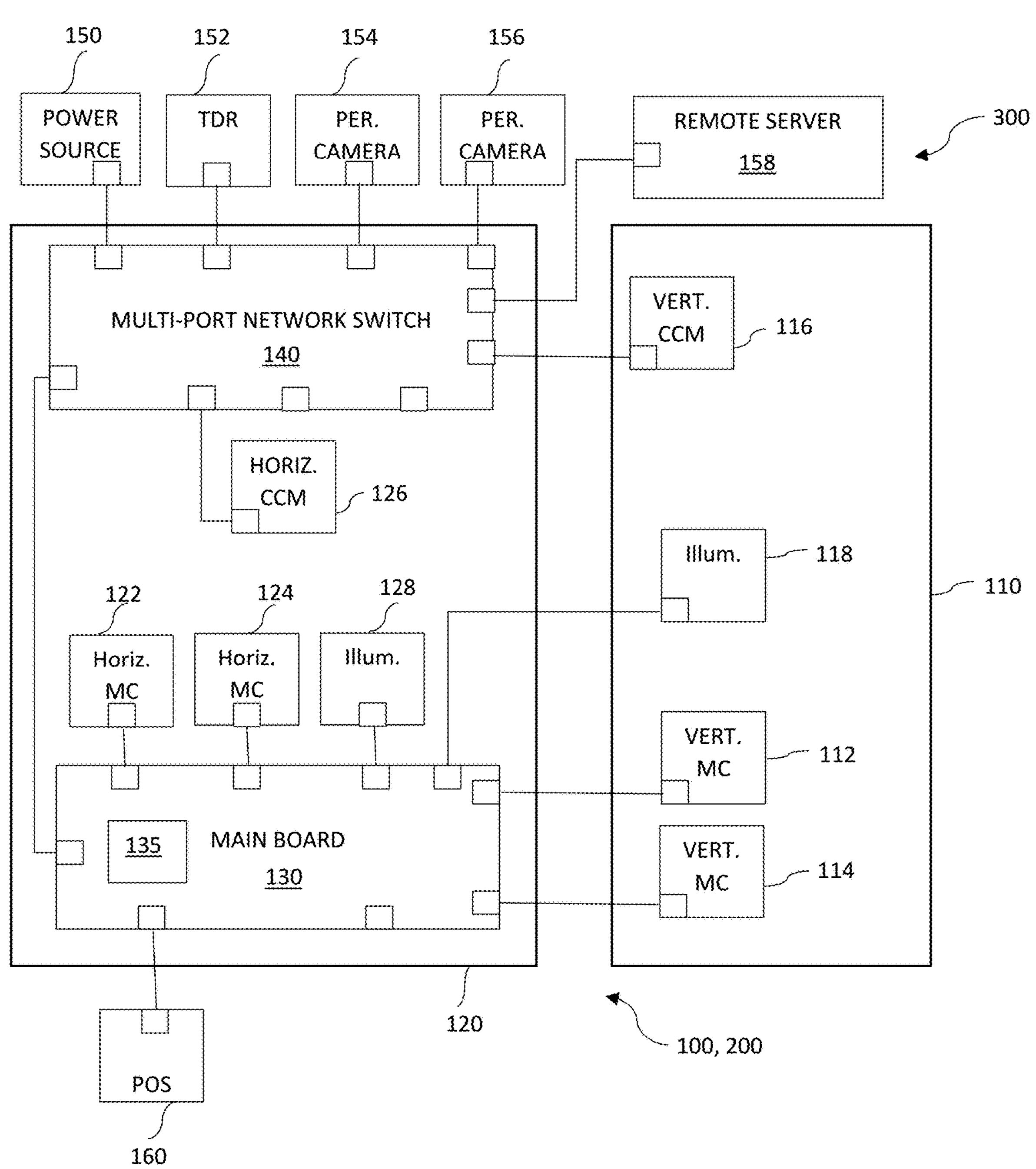
FIG. 3 is a simplified block diagram of an illustrative data reading system according to an embodiment of the disclosure.

FIG. 3 is a simplified block diagram of an illustrative data reading system 300 according to an embodiment of the disclosure. The data reading system 300 may include a data reader 100, 200 that may be operably coupled with one or more of a power source 150, the top-down reader (TDR) 152, peripheral cameras 154, 156, a remote service 158, or a point-of-sale (POS) system 160.

The data reader 100, 200 may be a bi-optic fixed retail scanner having a vertical housing 110 and a horizontal housing 120. The data reader 100, 200 may be installed in a retail environment (e.g., grocery store), which typically is disposed within a counter or other support structure of an assisted checkout lane or a self-checkout lane. The vertical housing 110 may include a structure that provides for one or more camera fields-of-view (through a vertical window) within a generally vertical plane across the read zone of the data reader 100, 200. The vertical structure provides an enclosure for one or more cameras 112, 114, 116, active illumination assemblies 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras 112, 114 may be configured to capture monochrome images through the vertical window of the data reader 100, 200. Likewise, horizontal monochrome cameras 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly useful in performing certain functions, such as produce recognition, item recognition or verification, and/or security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be generally oriented orthogonal to each other similar to the orientation of the windows or other angled arrangements (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the vertical monochrome imagers 112, 114 and the horizontal monochrome imagers 122, 124. These connections may be via a communication interface (e.g., a MIPI interface). The main board 130 may have decoding software embedded therein such that one or more on-board processors 135 may receive monochrome images to perform decoding on the optical indicia and provide the decoding result to a point-of-sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. Although a single block is shown representing one or more on-board processors 135, it is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or multi-port network switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 160 may be coupled directly to the main board 130. Such a connection may be via communication interfaces, such as USB, RS-232, or other such interfaces. In some embodiments, the POS 160 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch may include multiple ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products and/or devices configured to provide network synchronization and communication with multiple network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140 which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200 such as the one or more processors 135 supported by the main board 130. As such, image analysis (e.g., AI, machine learning, OCR, object recognition, item validation, produce recognition, analytics, etc.) may be performed on the color images internally within the data reader 100, 200 by the one or more processors 135 supported by the main board 130. In some embodiments, barcode decoding may also be performed on the color images internally within the data reader 100, 200 by the one or more processors 135 supported by the main board 130. Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources.

Image data from the monochrome cameras 112, 114, 122, 124 may be provided to the main board 130 to the processing/analysis modules located internal to the data reader 100, 200 such as the one or more processors 135 supported by the main board 130. As such, barcode decoding may also be performed on the color images internally within the data reader 100, 200 by the one or more processors 135 supported by the main board 130. In some embodiments, image analysis (e.g., AI, machine learning, OCR, object recognition, item validation, produce recognition, analytics, etc.) may be performed on the monochrome images internally within the data reader 100, 200 by the one or more processors 135 supported by the main board 130. Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reader 100, 200 such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reader 100, 200 by the one or more processors 135 supported by the main board 130. In some embodiments, barcode decoding may also be performed on such images internally within the data reader 100, 200 by the one or more processors 135 supported by the main board 130. Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (POE)) to the main board 130 and the color cameras 116, 126. Monochrome cameras 112, 114, 122, 124 and illumination assemblies 118, 128 may be powered via the main board 130.

Advantages of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

In some embodiments, the multi-port network switch 140 may be disposed within an external module having its own housing separate from the data reader 100. The multi-port network switch 140 may, thus, be located outside of the bioptic housing of the data reader 100 but may operably couple to the main board 130 and internal devices (e.g., vertical CCM 116, horizontal CCM 126) as well other external devices (e.g., TDR 152, cameras 154, 156, server 158, etc.) for providing the network backbone for communication and/or power as described above.

Figure 4:
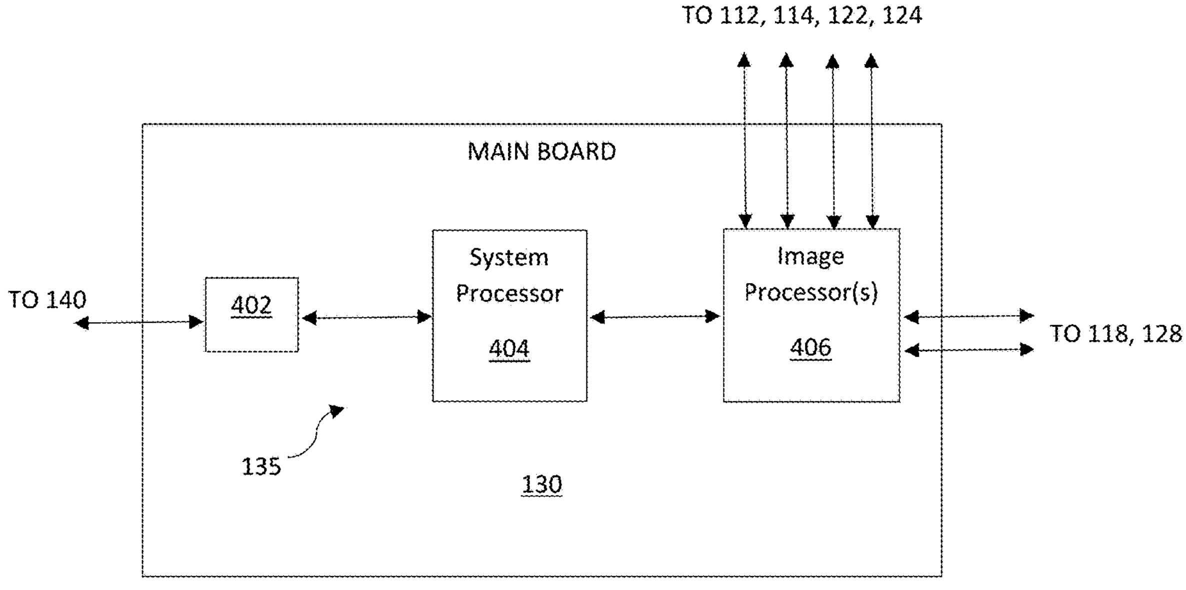
FIG. 4 is a simplified block diagram of certain components mounted on the main board according to an embodiment of the disclosure.

FIG. 4 is a simplified block diagram of certain components mounted on the main board 130 according to an embodiment of the disclosure. In particular, further details are provided regarding the one or more processors 135 which may include an Ethernet physical layer 402, a system processor 404, and an image processor 406. Additional processing elements are also contemplated among the one or more processors 135, such as for example, an artificial intelligence (AI) accelerator disposed on the main board 130 and coupled to the system processor 404 (e.g., via insertion into a PCIe slot on the main board 130).

The system processor 404 may be coupled to each of the Ethernet physical layer 402 and the image processor 406. The Ethernet physical layer 402 may be coupled with the multi-port network switch 140 to provide an interface between the main board 130 and the multi-port network switch 140. The image processor 406 may be coupled to the monochrome imagers 112, 114, 122, 124 to provide control (e.g., sync signal) and to receive monochrome images therefrom. The image processor 406 may be configured to receive and format image data from the cameras 112, 114, 122, 124 before being received by the system processor 404. In some embodiments, multiple image processors may be present such that each camera 112, 114, 122, 124 may have its own image processor associated therewith. In some embodiments, cameras may share an image processor for transmission to the system processor 404. For example, a single image processor (e.g., FPGA) may be configured to combine (e.g., concatenate) the image data from each of the monochrome cameras 112, 114, 122, 124 for the system processor to receive multiple views at a single point in time through one input. An example of such a process is described in U.S. Patent Publication No. 2022/0207969, filed Dec. 31, 2020, and entitled "FIXED RETAIL SCANNER WITH ANNOTATED VIDEO AND RELATED METHODS," the disclosure of which is incorporated by reference in its entirety. Image processor 406 may also be coupled to the illumination assemblies 118, 128 to provide control thereto (e.g., sync signal). In some embodiments, the sync signal may be generated by one of the Ethernet physical layer 402 or the system processor 404 which may be based on a system clock signal.

Embodiments of the disclosure may include four different monochrome camera views (e.g., two monochrome cameras located in the vertical housing and two monochrome cameras located in the horizontal). Each camera may include a sensor that embeds register statistical data (e.g., image statistics, histograms, etc.) into each image acquired from the image sensor. This register statistical data may be used for implementing advanced device features, and/or for reducing overall software overhead on the platform. In some embodiments, the embedded register and statistical data sent by the imagers may be in a MIPI CSI-2 packet format that may be unsupported by some CPUs that may be used as the system processor 404. Embodiments of the disclosure may include a data translator module (e.g., FIGS. 5A, 5C) implemented into the image processor 406 (e.g., FPGA) configured to convert the embedded register and statistical data into pixel data, allowing the data to be encoded and sent image processor 406 to the system processor 404, thus enabling the system processor 404 to utilize its existing video processing subsystems (e.g., FPGA CSI-2).

The data translator may be configured to convert embedded register and statistical data from images into pixel data according to an embodiment of the disclosure. The data translator may be integrated within the CSI-2 video processing subsystem functionality that is used inside the image processor 406 (e.g., FPGA), and allows for the seamless integration of the embedded data into video data by parsing, modifying, and repackaging the image data in real time with the embedded register and statistical data as pixel data. The method and location for the data translator may be useful to overcome certain issues. First, the system processor 404 may not support the inclusion of embedded data if the system processor 404 is to process pixel data in hardware. Attempting to send this embedded data to the main processor 404 when it is configured in this manner may cause the system processor 404 to discard all embedded data. If the system processor 404 does not perform pixel processing, it is possible to include the embedded data in an image, however, doing so then shifts the burden to the software to decode and wrap the image for further use in the system, significantly increasing overhead and processing time. In a platform where timing is extremely constrained and tied directly to performance, this alone would make this strategy undesirable. A second issue may be the inability for the image processor 406 (e.g., FPGA) to process and pass through the embedded data. In some designs, the CSI-2 video processing subsystem that is implemented on the FPGA may not pass through any non-video (non-pixel) data. This would prevent the system processor 404 from being able to receive any of this embedded data, even if the processor 404 did support it. One method to overcome these limitations is to calculate the required embedded information (e.g., image statistics, histograms, etc.) in software which may end up using over 90% of its image processing time on these two tasks alone, severely hindering performance. This method also may not allow for accurate tagging of sensor settings to each image, making it difficult to implement image interleaving as the required precision of knowing what frames are at what sensor settings is not lost without this data.

Embodiments of the disclosure include a data translator that is configured for both register, statistical, and histogram data to be transmitted and tagged to each image that the system processes. This data enables significant reductions in software overhead by eliminating the need for the platform to calculate the statistical data and the histogram data itself. This data will also allow for the product to achieve advanced features, such as interlacing video with different camera settings for different durations, by allowing the product to know the exact configuration of each sensor at all times, and to be able to associate that configuration with the exact image the configuration generates.

The data translator is configured to change the associated data type (DT) of the individual MIPI data packets as they enter the image processor 406 (e.g., FPGA), before running those modified packets through the existing CSI video processing already existing inside the FPGA. By modifying the incoming DT of the data packets before they enter the existing data processing subsystems, the data translator allows those data packets to be buffered in the already existing data buffers, reducing FPGA utilization and helping to maintain the strict timing tolerances required by these processing subsystems.

When modifying the incoming data for acceptance into the FPGA, two distinct steps may be performed within the FPGA. First, the data translator may change the DT to the requested DT. For example, for embedded data the DT is "0x12" which may be changed to the requested video packet DT (e.g., "0x2A"-"0x2F" or RAW8). At the same time this is being done, the second task the data translator may achieve is modifying the "valid Packet" signals that are used internally in the FPGA. These signals are generated by the MIPI RX_PHY receiver on the FPGA as a method to signify what data is valid video, and data is not to be processed as video (blanking signals for example).

By modifying both the DT and valid packet signals inside the FPGA as they are generated, and before the next clock edge, the data translator may successfully allow this data into the FPGA's video processing buffers and from that point it is carried forward to the FPGA's MIPI TX_PHY, where it is sent to the system processor 404 as video data. The extra data can then be found appended as extra video lines either before and/or after the original video data. The extra included data, now present as additional lines of pixels in the image, may change the problem from calculating data, to simply a data parsing exercise, reducing the amount of CPU resources needed to implement these features, and improving device performance. Further modification of histogram or other image statistics may also be modified in a comparable manner if needed by other platform limitations.

Figures 5A, 5B:
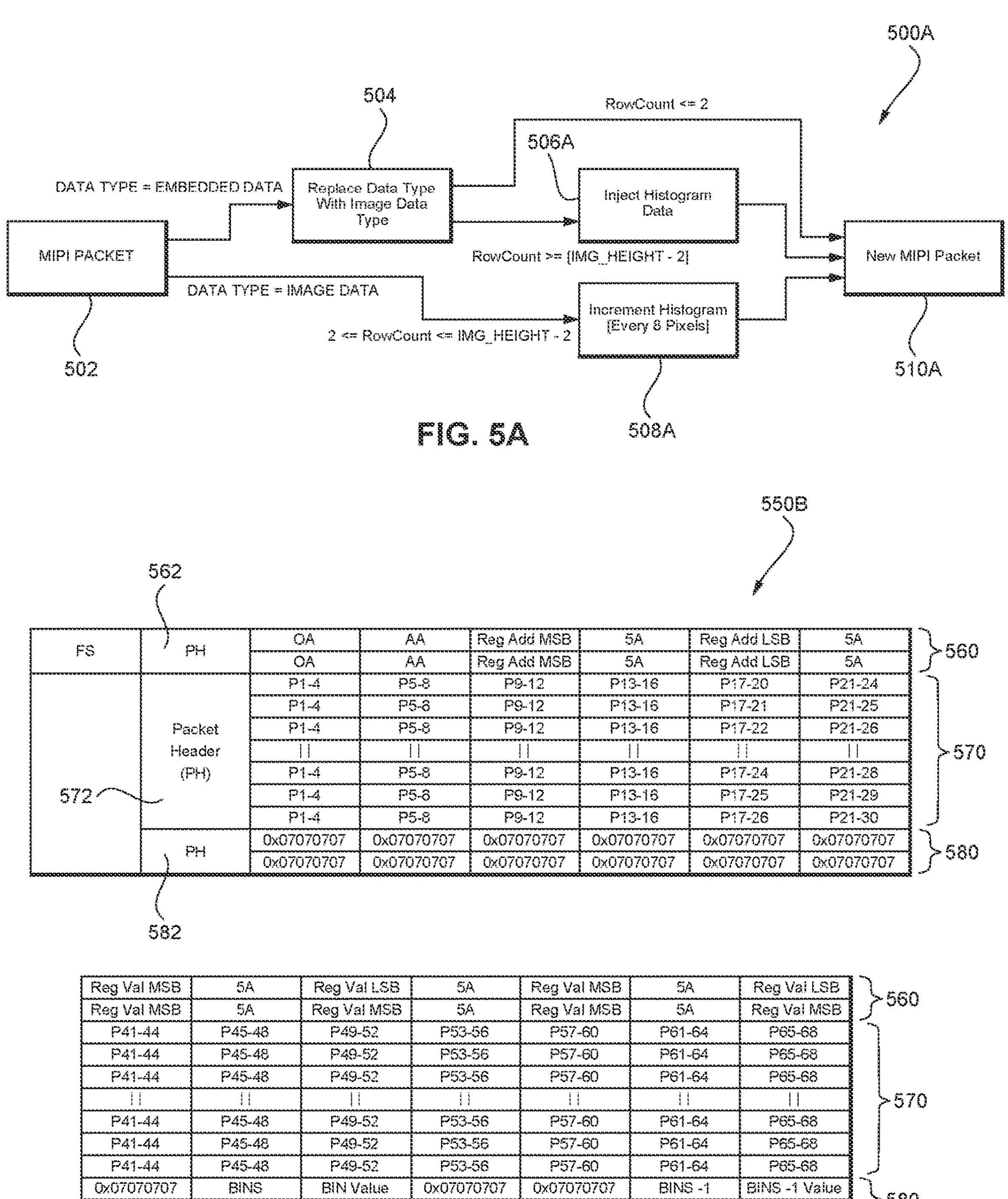
FIG. 5A is a flowchart illustrating methods of performing the data translation to convert embedded register and statistical data from images into pixel data according to an embodiment of the disclosure.
FIG. 5B is an example of portions of a data packet shown for purposes of demonstrating a data translation process according to an embodiment of the disclosure.

FIG. 5A is a flowchart illustrating a method 500A of performing the data translation to convert embedded non-video data such as register, statistical, and/or histogram data from images into pixel data (image or video data) according to an embodiment of the disclosure. At operation 502, an image may be received for being converted into a modified image. The image may be received as MIPI packets with the modified image being transmitted to the system processor as modified MIPI packets. The image may include embedded data and video data, with the embedded data type being replaced by the image data type at operation 504. For rows above a predetermined limit (e.g., RowCount>=IMG_HEIGHT−2), histogram may be injected at operation 506A. This histogram may be a real-time calculation of the histogram from the image data, that is then injected as image pixel data. At operation 508A, the histogram may be incremented (e.g., sampled every 8 pixels) for the original image data, with the results of operations 506A and 508A being combined to form the new (modified) MIPI packet 510A (now with the extra included data present as additional lines of pixels in the image) that is sent to the system processor 404 for further advanced processing. In this embodiment, the additional lines may be from a real-time calculation of the histogram data that is added on top of the image data (e.g., replacing the original image data to include the histogram data and other data as pixel data).

As discussed above, some embodiments may include a received image that includes concatenated images from multiple cameras for processing. These images (e.g., 4×1280 pixel wide) may be time correlated camera views that have been combined into a single image (e.g., 1×5120 pixel wide). As the image data from the montage image is being read into the data translator, the data translator may still calculate an independent histogram for the image of each camera view. The data translator may receive data of the image one line at a time, and count the pixels to determine which pixel is associated with which imager. As the first row is received, the data translator starts a histogram for the first row for first imager, starts a histogram for the first row of the second imager, and so on. As the next row is received, the data translator determined histogram data for the second row for each imager, and so on. At the end, the data translator may be configured to sum up the results for the histogram of each histogram such that a separate histogram is created for each imager, after which the histogram is injected into the data stream as pixel data for further processing or analysis by the system processor 404 or other processor of the system.

In some embodiments, the received image may be a single image from a single camera, in which case the real-time histogram calculation and injection may be performed on an image having a single camera view. In such an embodiment, if there are multiple camera views, similar processes may be performed on the images received from those cameras that results in a separate and independent process for translating the image data to include the histogram data and other embedded data as pixel data. In some embodiments, these modified images may be created from single images, but may be later concatenated after having the histogram data injected as pixel data. Thus, the concatenated super-image (or montage) may be created from the modified images as opposed to being created first and then being modified together as a single image.

FIG. 5B is an example of portions of a data packet 550B (e.g., MIPI packet) shown for purposes of demonstrating a data translation process according to an embodiment of the disclosure. The top part of the data packet 550B shown represents the beginning of a frame (frame start (FS)) and the bottom part of the data packet 550 represents a middle part of the frame. The end of the frame is not shown, but would contain additional data, footers, and a frame end (FE). The data packet 550B may be captured by an imager of the system and provided to the data translator for providing a modified data packet to the processor for further processing (e.g., decoding, advanced analysis, etc.).

The data packet 550B may include a first portion 560 corresponding to register data and statistical data, a second portion 570 corresponding to image data, and a third portion 580 corresponding to histogram data. Each portion 560, 570, 580 may include a respective packet header (PH) 562, 572, 582 defining the data type for the data of that portion. As described above, for a captured image the first packet header 562 and the third packet header 582 may indicate the data type for the first portion 560 and the second portion 580 to be embedded data, while the second packet header 572 may indicate the data type for the second portion of data to be image data or video data. This captured data may be so defined by the imager capturing the image data.

For a typical imager, the first portion 560 may include register and other statistical information related to the image. In this example, the first portion 560 may include the first two rows of the data packet 500B (e.g., RowCount<=2), and the third portion 580 may include the last two rows of the data packet 550B (e.g., RowCount>=IMG_HEIGHT−2). The second portion 570 may include the rows of the data packet 550B therebetween (e.g., 2<=RowCount<=IMG_HEIGHT−2). In this case the image height (IMG_HEIGHT) refers to the number of rows of the entire data packet as opposed to what is typically considered the pixel data captured by the imager. Such pixel data in the original data packet 550B is typically contained within the second portion 570 that is originally defined as having the data type of image data or video data. Two rows for the first and third portions 560, 580 is used herein as a non-limiting example, and other sizes of such embedded data related to the first portion 560 and/or third portion 580 are contemplated in embodiments of the disclosure. Likewise, the organization of the data packet 550B (e.g., order of data portions) may also be different than that shown in FIG. 5B.

The first packet header 562 may be modified by the data translator (operation 504) to indicate the data type of the first portion 560 is image data or video data as opposed to the original designation of embedded data by the imager. As a result, the remaining data (e.g., bytes shown to the right of the first packet header 562) of the first portion 560 will be understood by the processor to be image or video data. This remaining data itself may not be modified in some embodiments, as is indicated by the top line of FIG. 5A between blocks 504 and 510A for the rows defined as RowCount<=2.

The third packet header 582 may also be modified by the data translator (operation 504) to indicate the data type of the third portion 580 is image data or video data as opposed to the original designation of embedded data by the imager. As a result, the remaining data (e.g., bytes shown to the right of the third packet header 562) of the third portion 580 will be understood by the processor to be image or video data. This remaining data of the third portion 580 may also be modified in some embodiments by injecting newly calculated histogram data (operation 506A) by the data translator for the rows defined as RowCount>=IMG_HEIGHT−2. For example, the data translator may sample histogram data for the pixel data of the second portion 570 (operation 508A) and inject the calculated histogram data into the third portion 580 for the modified data packet 510A. Injecting the calculated histogram data may include rewriting the original histogram data generated by the imager with the new histogram data determined by the data translator. In some embodiments, the original histogram data of the original data packet and the new histogram data in the modified data packet may have different bit sizes (e.g., [10 bits][10 bits] converted to [8 bits][8 bits]+overflow bits) to simplify the subsequent analysis—particularly if analysis software runs in a different pixel mode (e.g., 8 bit pixel mode) than the image capture mode (e.g., 10 bit pixel mode). In this case, the least significant bits of the [10 bit][10 bit] may be histogram may be discarded. Frame start (FS), Frame end (FE), packet footer(s) (not shown) may also be modified in some embodiments for consistency with changes made to the headers.

In some embodiments, the decoder may process the entire image data (i.e., portions 560, 570, 580) of the modified data packet as they may all have an image data type. In some embodiments, the decoder may ignore or crop out the rows of the image data associated with portions 560, 580 corresponding to what typically would be embedded data such as statistical data or histogram data and only process the image data associated with the second portion 570 that corresponds to the visual image data of the scene. Doing so may reduce some of the processing time for decoding. For the additional features utilizing the statistical data, histogram data, etc. the processor may be configured to analyze the pertinent rows of (now) image data (because of the modified data type) and ignore the rows not associated with the desired data to be used in the analysis or related task.

Figure 5C:
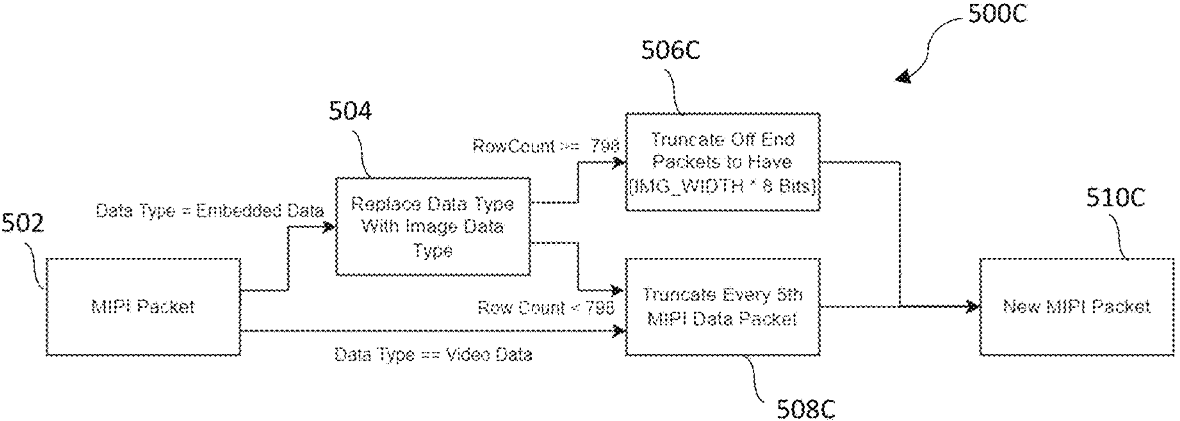
FIG. 5C is a flowchart illustrating methods of performing the data translation to convert embedded register and statistical data from images into pixel data according to another embodiment of the disclosure.

FIG. 5C is a flowchart illustrating a method 500C of performing the data translation to convert embedded register statistical data from images into pixel data according to another embodiment of the disclosure. At operation 502, a MIPI packet of the image may received for being converted into a modified MIPI packet for the modified image. The MIPI packet may include embedded data and image or video data, with the embedded data type being replaced by the image data type at operation 504. For rows above a predetermined limit (e.g., RowCount>=798), end packets may be truncated (e.g., to have IMG_WIDTH*8 Bits) at operation 506C. For rows below the predetermined limit (e.g., RowCount<=798) certain data packets may be truncated (e.g., every $5^{th}$ packet) at operation 508C, with the results of operations 506C and 508C being combined to form the new (modified) MIPI packet 510C (now with the extra included data present as additional lines of pixels in the image) that is sent to the system processor 404 for further advanced processing. One difference in the methods of FIG. 5C and FIG. 5A is that the method of FIG. 5A may rely on the imager to provide data packets that are the same size (e.g., 8 bits) as the size of the data packet output by the data translator (e.g., 8 bits), whereas the method of FIG. 5C may rely on the data translator to truncate certain packets to accommodate an incoming packet size from the imager (e.g., 10 bits) that is different than the size of the data packet output by the data translator (e.g., 8 bits).

The additional data (e.g., histogram data) may be utilized in various applications by the system processor 404 and/or other processors of the data reading system. Embodiments of the disclosure may utilize the additional data described above (e.g., histogram data) for advanced features such as item detection, item tracking, double read control during a period of time in which the item is in the scan volume, illumination control, image or video acquisition control, image or video output control, read rate increase (e.g., pattern recognition if no barcode is read), loss prevention tasks (e.g., item image vs label read), video analytics, wake up of the scanner and/or POS system, and other similar features where a change between frames may be useful, in an environment such as in a checkout lane or self-checkout station. Additional details of certain tasks are described in U.S. Pat. No. 8,632,011, issued Jan. 21, 2014, and entitled "Systems and methods for illuminating a scan volume of an optical code reader," and U.S. Pat. No. 10,824,826, issued Nov. 3, 2020, and entitled "Utilization of imaging bar-code scanners for detecting anomalies with user scanning methods," the disclosure of each of which is incorporated by reference in its entirety.

Figure 6:
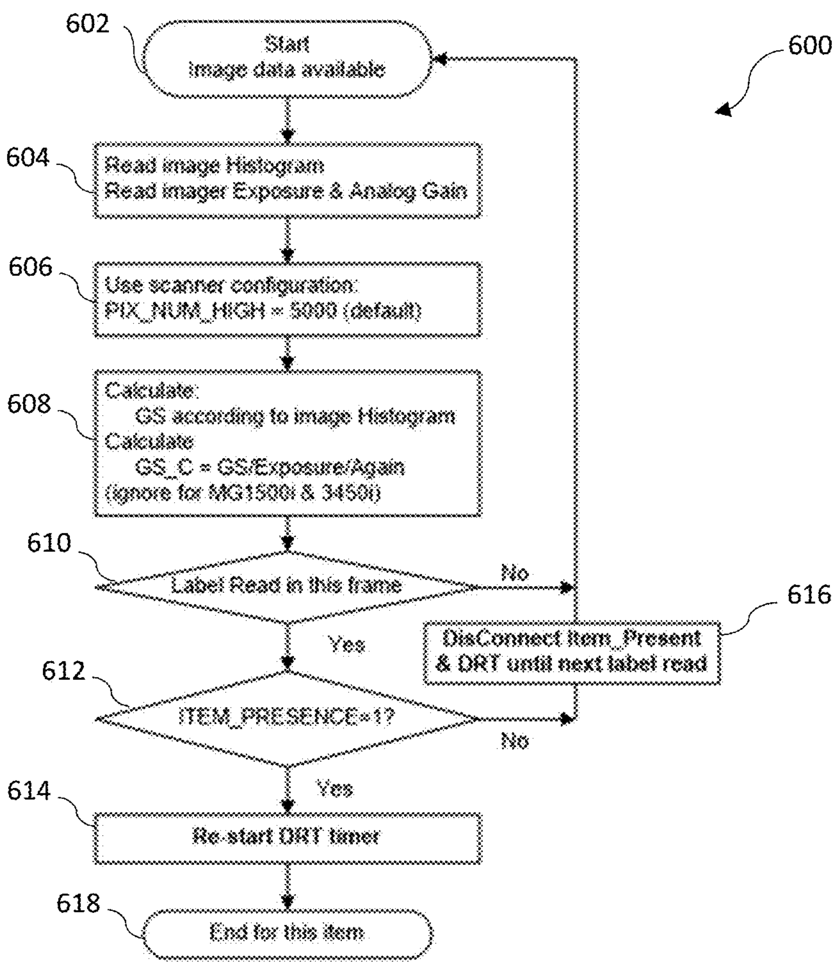
FIG. 6 is a flowchart illustrating a method for performing tasks using histogram data according to an embodiment of the disclosure.

FIG. 6 is a flowchart illustrating a method 600 for performing tasks using histogram data according to an embodiment of the disclosure. For every image frame, the following may be recorded:

Histogram 64 bins, from image context data (or by subsample calculation if not available).

Image acquisition condition (exposure time, analog gain from Image header)

The following Parameter Definition and Example Default Values (other default values may be selected in some embodiments) may also be provided:

PIX_NUM_HIGH=5000; % greyscale of PIX-_NUM_HIGH-th highest pixels

WINDOW_SIZE=0.5*40; % # of frames used for baseline (frame rate 40 fps)

WINDOW_PERCENT=30; % lowest percentage of GS points for baseline

DELTA_ENTRY=5; % rise to 5 bins above baseline for item entry

DELTA_EXIT=2; % drop to 2 bins above baseline for item exit

These values may be configurable and adjusted for a desired sensitivity.

To calculate a histogram (e.g., via EV76C560 imager), the 64-bin histogram data of different color (e.g., R/Gr/Gb/B even for monochrome imagers) in the image footer, the total number, it will overflow since only 2-byte/bin is sued. For each imager (e.g., OV9282 imager) there is no histogram data embedded in the image so it can be calculated by the processor (e.g., A5 processor), the number of byte/bin>total imager pixels to avoid overflow. Otherwise scale down such as divided by 8 is recommended. For applications where no histogram is available from the image footer or imager interface inside the processor, sub-sample counting such as count only every 17 pixels. The number 17 instead of 8, 16, etc. is to make the sub-sample more random. For scanners with AEC turned off, GS_C=GS. In some embodiments, histogram data is embedded in the pixel data via a data translator as described above.

At operation 602, the process may start with the image data being available. At operation 604, the image histogram of the image may be read and the imager exposure and analog gain. At operation 606, the scanner configuration for PIX_NUM_HIGH may be used (e.g., 2000, 5000, etc. as desired). This is a configurable threshold level for how sensitive the detection is desired to be for objects of interest to be detected or tracked. At operation 608, the greyscale (GS) value may be calculated according to image histogram as well as the current greyscale (GS_C) value that corresponds to the current frame that takes into account the imager exposure and analog gain. The current greyscale. At operation 610, the label may be read, which (if a read occurs) may check to see if the item is still present at operation 612. If so, then the double read timer may be restarted 614. The item presence bit may be set to 1. If not, then the double read timer may be disabled (or expired) until the next label read at operation 616. The item presence bit may be set to 0.

Although FIG. 6 provides an example of a use case in which the histogram analysis is used for item detection/tracking as a proofing stage for a double read protection process, it should be understood that other processes are also contemplated in which the general histogram analysis may be used. For example, other processes may be informed when an object shows up and/or exits, when a grey level changes by a certain percentage, etc. In response to detecting this information, different tasks may be performed. The output of the process is whether an item is present or not present. That output may be received by other processes to take a variety of different actions as described above.

Figure 7A:
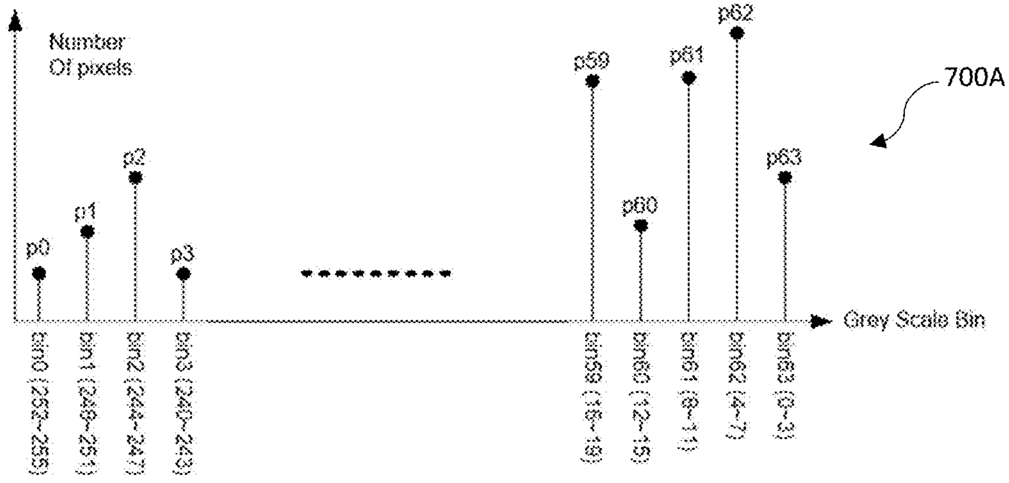
FIGS. 7A-7B show examples of image histograms having 64 bins.
Figure 7B:
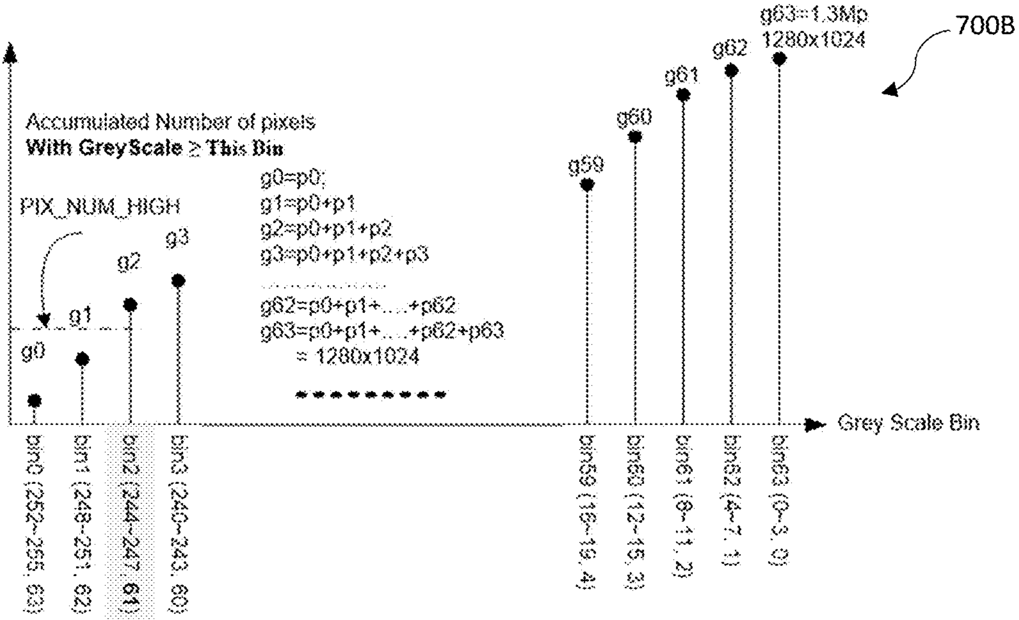
Figure 8:
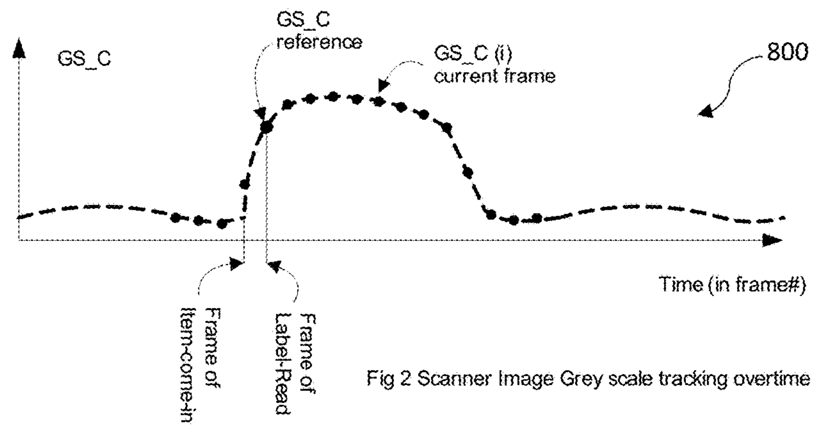
FIG. 8 is an example plot showing frames that compares a baseline value with a current frame greyscale value from which an item may be detected.

FIG. 7A shows an example of an image histogram having 64 bins. FIG. 7B shows an example of an image accumulated histogram having 64 bins. The accumulated histogram sums up all pixels at specific greyscale levels (e.g., 255, 254, 253, etc.). Then based on the accumulated histogram, it may be determined how many pixels to consider at in the analysis. FIG. 8 is an example plot showing frames that compares a baseline value with a GS_C (current frame greyscale) from which an item may be detected.

Figure 9:
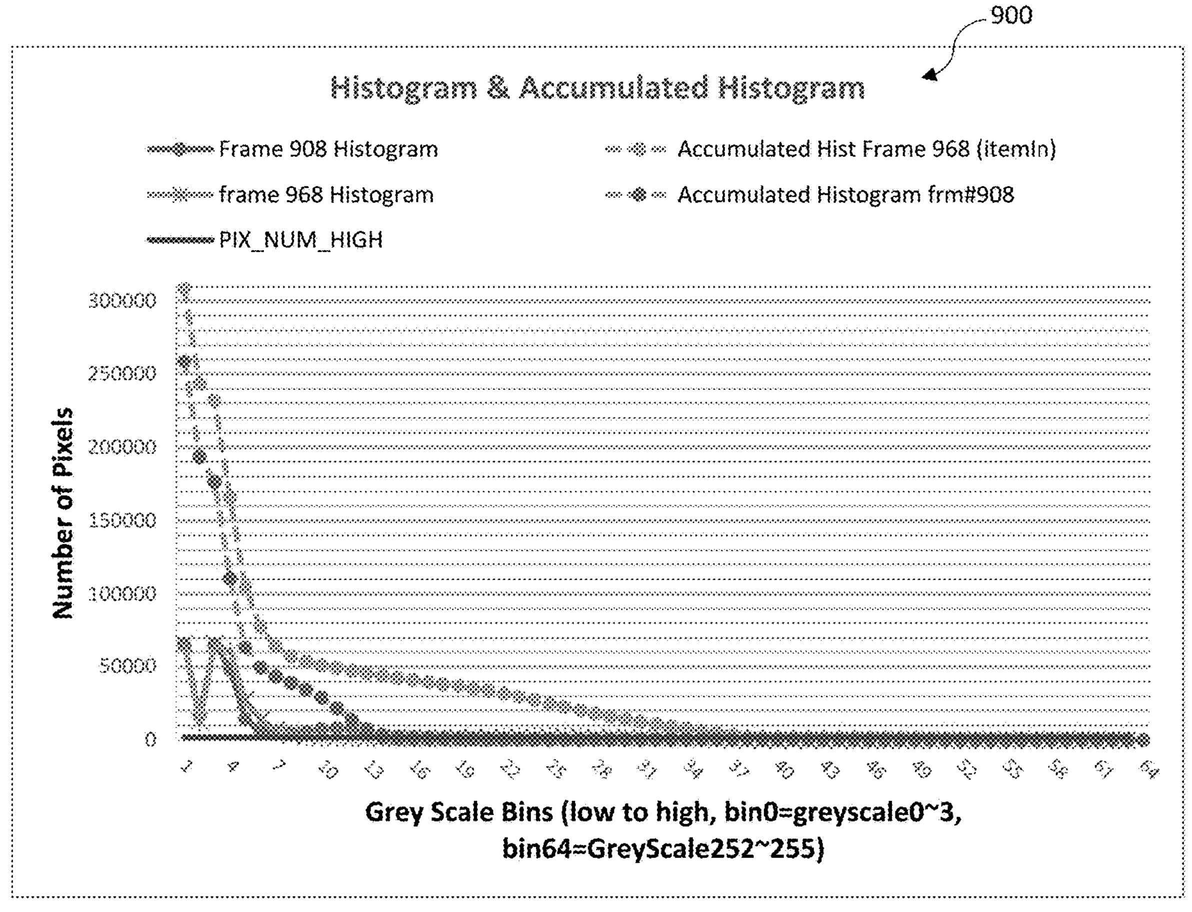
FIGS. 9-11 are data plots showing various examples of histograms and accumulated histograms generated from images captured by a scanner.
Figure 10:
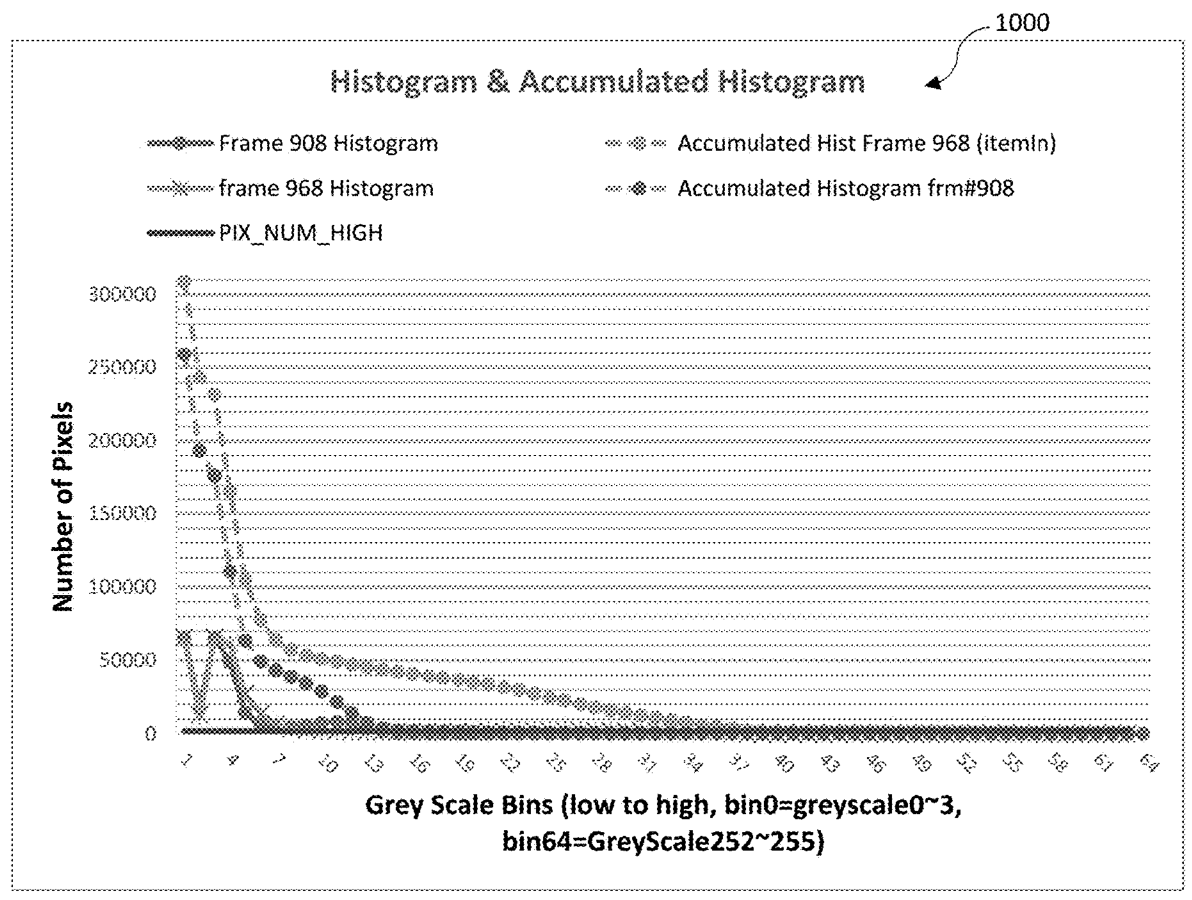
Figure 11:
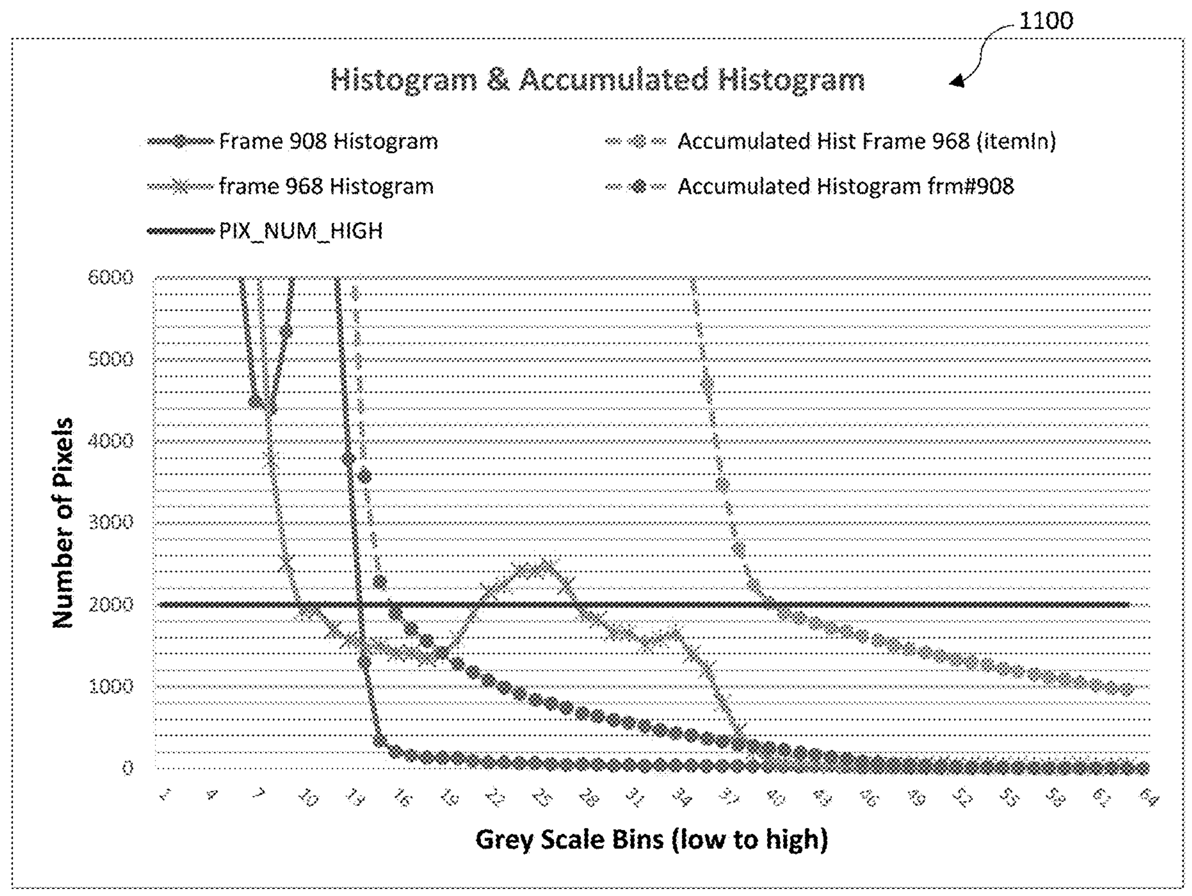
Figure 12:
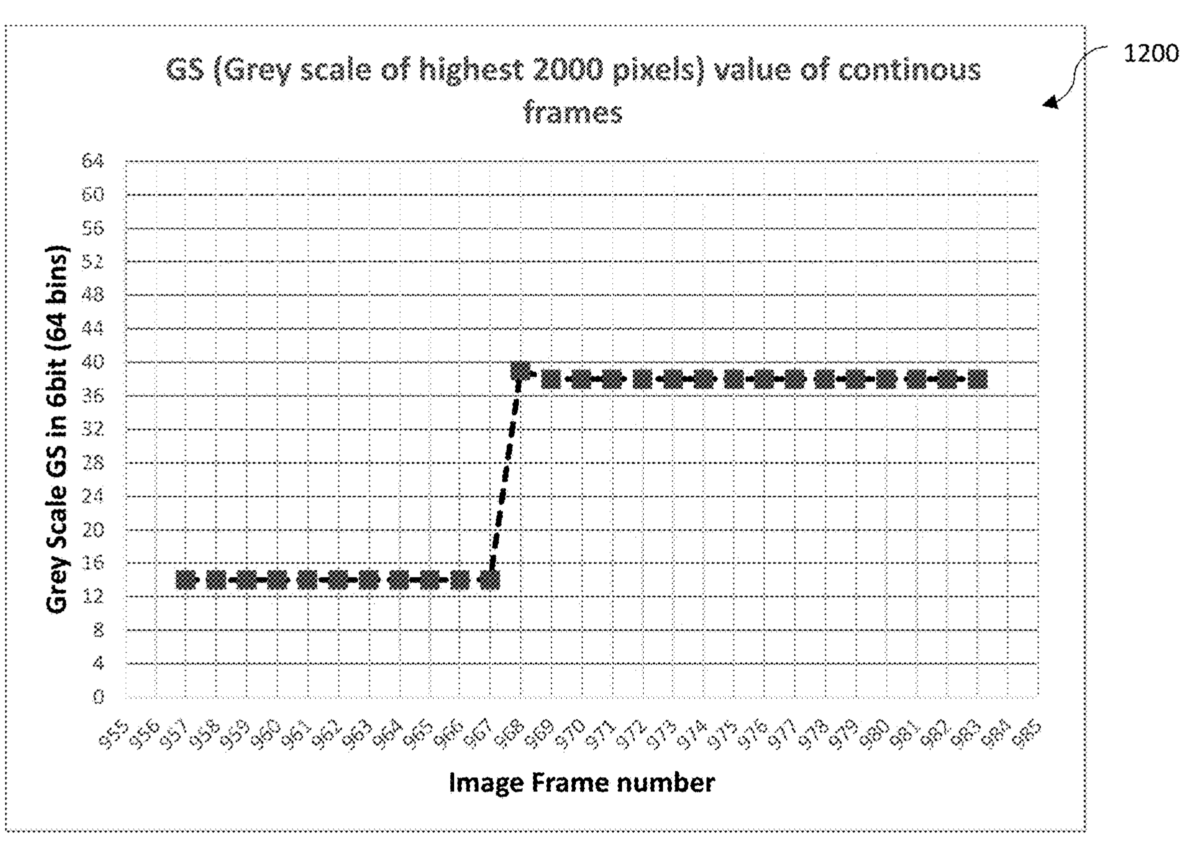
FIG. 12 is a plot for a greyscale value of a plurality of frames plotted over time.
Figure 13:
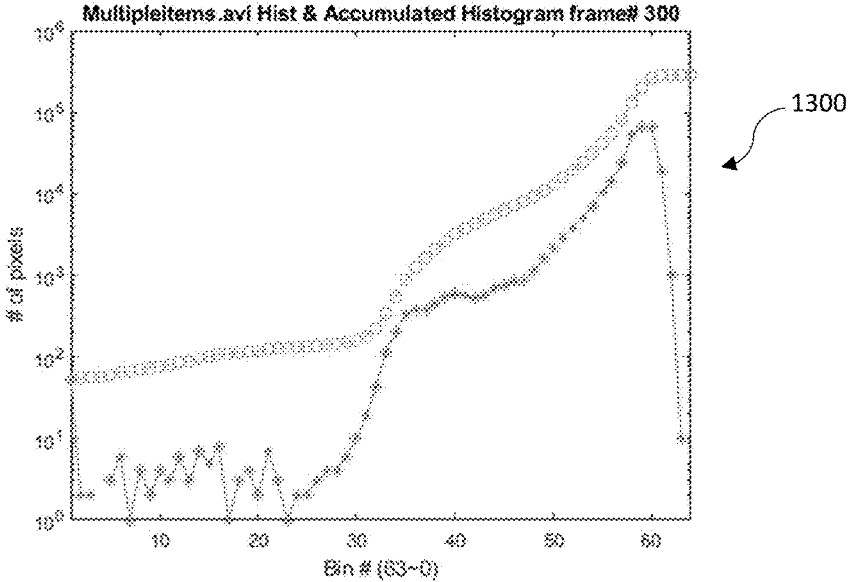
FIGS. 13-17 show various plots of data indicating item tracking via histogram data and accumulated histogram data.
Figure 14:
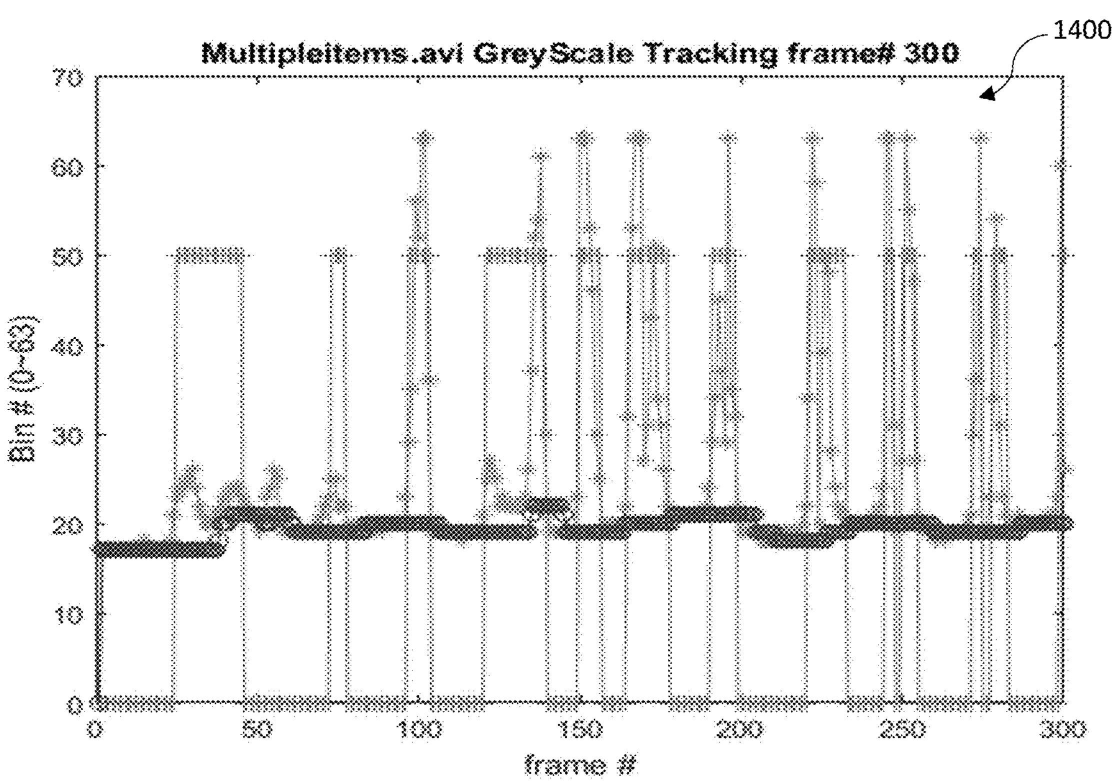
Figure 15:
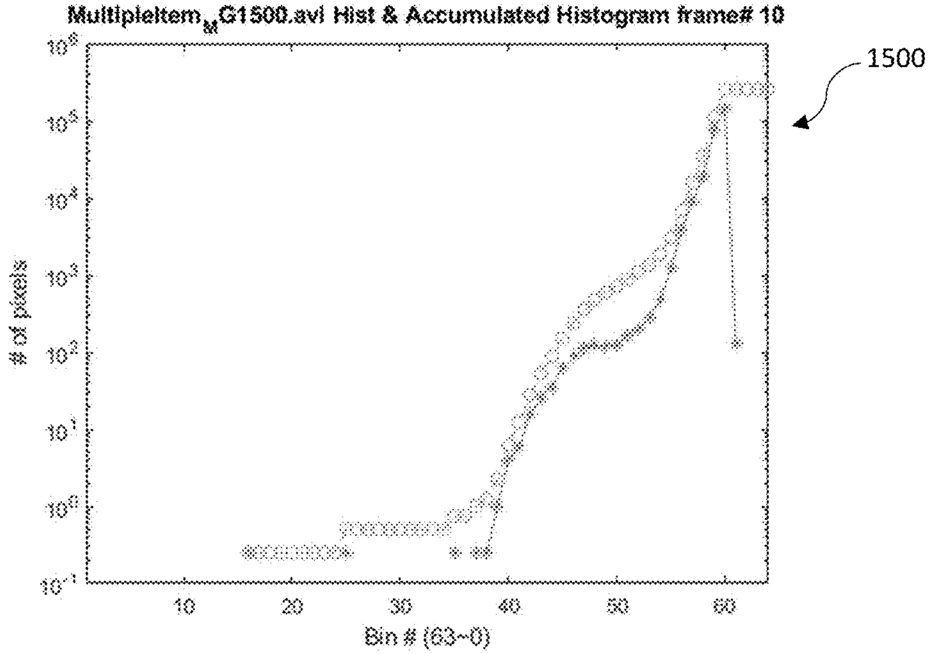
Figures 16, 17:
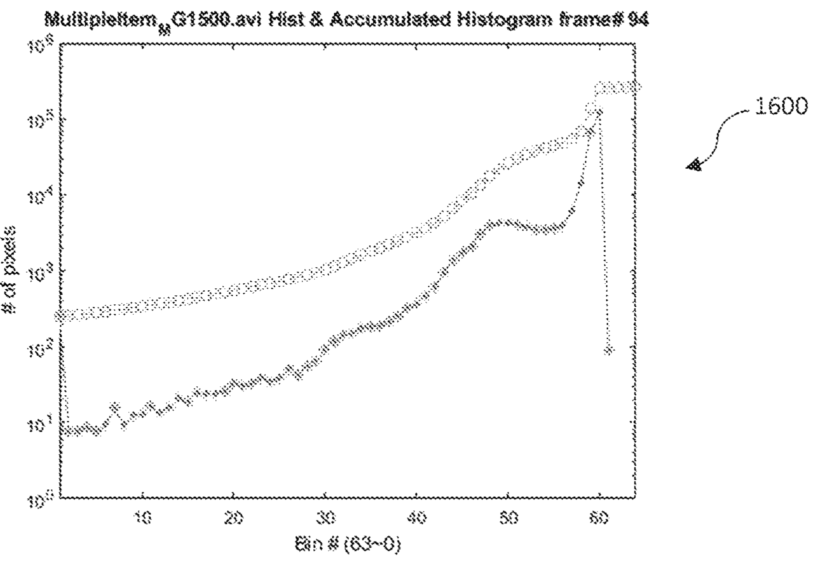

FIGS. 9-11 are data plots 900, 1000, 1100 showing various examples of histograms and accumulated histograms generated from images captured by a scanner. FIG. 12 is a plot 1200 for a greyscale value of a plurality of frames plotted over time. When the greyscale value jumps, it may be determined that an item has been detected. FIGS. 13-17 show various plots 1300, 1400, 1500, 1600 of data indicating item tracking via histogram data and accumulated histogram data.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner including a data reader, comprising: at least one imager configured to capture one or more images having the form of a data packet including: a first portion corresponding to register data and/or statistical data having a data type defined as embedded data; a second portion corresponding to image data or video data having a data type defined as image data or video data; a system processor configured to decode one or more indicia; and an image processor operably coupled between the at least one imager and the system processor, the image processor including a data translator configured to: convert the data type for the register data and/or the statistical data of the first portion of the data packets of the one or more images from being defined as embedded data into pixel data is defined as image data or video data; combine the first portion of the data packet with a modified data type with image pixel data of the second portion of the data packet that is sent to the system processor as a modified data packet for additional processing and decoding.

2. The fixed retail scanner of claim 1, wherein the embedded register and/or statistical data includes at least one of histogram data or image statistics.

3. The fixed retail scanner of claim 2, wherein the system processor is configured to detect a presence of an object based on the histogram data, wherein the presence of an object includes detecting item entry into a scan volume and item exit from the scan volume.

4. The fixed retail scanner of claim 2, wherein the system processor is configured to detect a presence of an object based on the histogram data, wherein the system processor is further configured to perform one or more of item detection, item tracking, double read control, illumination control, image or video acquisition control, image or video output control, read rate increase, loss prevention tasks, or video analytics based on the detected presence of the object.

5. The fixed retail scanner of claim 1, wherein the data translator is further configured to calculate a real-time histogram from the one or more images and inject the real-time histogram as pixel data having a data type of image data or video data into the modified data packet to be sent to the system processor with the image data captured by the at least one imager.

6. The fixed retail scanner of claim 1, wherein the at least one imager includes an imager located within a base unit of a bi-optic scanner, an imager located within a top-down reader of the bi-optic scanner, or an imager located within a peripheral camera of a system including the bi-optic scanner, and wherein the at least one imager includes at least one of a monochrome imager or a color imager.

7. The fixed retail scanner of claim 1, wherein the image processor is an FPGA.

8. The fixed retail scanner of claim 1, wherein the data translator is configured to convert the data type by modifying a packet header associated with the first portion of the data packets while not modifying other content of the first portion of the data packets.

9. The fixed retail scanner of claim 1, wherein the data packet further includes a third portion corresponding to histogram data having a data type defined as embedded data, and wherein the data translator is configured to convert the data type of the third portion of the data packets from being defined as embedded data into pixel data that is defined as image data or video data.

10. The fixed retail scanner of claim 9, wherein the data translator is configured to convert the data type of the third portion by modifying a packet header associated with the third portion of the data packets and also rewriting the original histogram data generated by the imager with the new histogram data determined by the data translator.

11. The fixed retail scanner of claim 10, wherein the system processor is configured to:

perform decoding of the second portion of the data packets while ignoring the first and third portions of the data packets; and performing one or more of item detection, item tracking, double read control, illumination control, image or video acquisition control, image or video output control, read rate increase, loss prevention tasks, or video analytics based on a detected presence of the object from analysis of the first portion and/or the third portion of the data packets while ignoring the second portion of the data packets.

12. A fixed retail scanner including a data reader, comprising:

at least one imager configured to capture one or more images;

a system processor configured to decode one or more indicia; and an image processor operably coupled between the at least one imager and the system processor, the image processor including a data translator configured to convert embedded register data and/or statistical data from one or more images into pixel data that is combined with image pixel data that is sent to the system processor as a modified data packet for additional processing and decoding, wherein the at least one imager includes a plurality of imagers that each capture images such that a combined image is formed from time-correlated views of the plurality of imagers, and wherein the data translator is configured to calculate a separate real-time histogram associated with each imager from the combined image and inject the real-time histograms as pixel data into image data for the combined image that is sent to the system processor.

13. The fixed retail scanner of claim 12, wherein the data translator is configured to read in the combined image row by row and count pixels to determine which portion of the row is associated with each imager when calculating the histogram.

14. A method of pre-processing image data for a fixed retail scanner, the method comprising:

capturing one or more images as a data packet via at least one imager of a fixed retail scanner, the images having the form of a data packet including:

a first portion corresponding to register data and/or statistical data having a data type defined as embedded data; and a second portion corresponding to image data or video data having a data type defined as image data or video data;

converting, via a data translator implemented in an image processor operably coupled between the at least one imager and the system processor, the data type for the register data and/or the statistical data from the first portion of the data packets of the one or more images from being defined as embedded data into pixel data that is defined as image data or video data combining the first portion with its modified data type with image pixel data of the second portion;

sending the combined pixel data as a modified data packet from the image processor to the system processor; and decoding one or more indicia from the one or more images based on the modified data packet via a system processor of the fixed retail scanner.

15. The method of claim 14, wherein the embedded register and/or statistical data is received as an embedded data type and translated to an image data type by the data translator.

16. The method of claim 14, wherein histogram data in a data packet captured by the at least one imager is received as an embedded data type with the data packet.

17. The method of claim 16, further comprising the data translator sampling a real-time histogram of the one or more images and injecting the real-time histogram data into the modified data packet as an image data type.

18. The method of claim 17, wherein injecting the real-time histogram into the modified data packet includes replacing the histogram data originating from the at least one imager with the real-time histogram data sampled by the data translator.

19. The method of claim 18, further comprising performing one or more of item detection, item tracking, double read control, illumination control, image or video acquisition control, image or video output control, read rate increase, loss prevention tasks, or video analytics based on a detected presence of the object from the real-time histogram data from the modified data packet.

20. The method of claim 17, further comprising ignoring portions of the modified data packet associated with the register and statistical data and the real-time histogram data during the decoding.

* * * * *